United States Patent
Nakane

(10) Patent No.: US 8,526,281 B2
(45) Date of Patent: Sep. 3, 2013

(54) INFORMATION RECORDING METHOD AND APPARATUS, INFORMATION RECORDING MEDIUM, AND INFORMATION RECORDING MEDIUM MANUFACTURING METHOD AND APPARATUS

(75) Inventor: Kazuhiko Nakane, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 846 days.

(21) Appl. No.: 12/677,724

(22) PCT Filed: Apr. 21, 2008

(86) PCT No.: PCT/JP2008/057675
§ 371 (c)(1),
(2), (4) Date: Mar. 11, 2010

(87) PCT Pub. No.: WO2009/050907
PCT Pub. Date: Apr. 23, 2009

(65) Prior Publication Data
US 2010/0202277 A1 Aug. 12, 2010

(30) Foreign Application Priority Data
Oct. 19, 2007 (JP) .................................. 2007-272417

(51) Int. Cl.
*G11B 11/00* (2006.01)
(52) U.S. Cl.
USPC .................................... 369/53.21; 369/275.1
(58) Field of Classification Search
None
See application file for complete search history.

(56) References Cited

U.S. PATENT DOCUMENTS

| 6,097,814 | A | 8/2000 | Mochizuki |
| 6,687,826 | B1 | 2/2004 | Owa |
| 2002/0114238 | A1 | 8/2002 | Tosaki et al. |
| 2002/0136119 | A1 | 9/2002 | Van Kollenburg |
| 2003/0231334 | A1 | 12/2003 | Nagai et al. |
| 2005/0036413 | A1 | 2/2005 | Kuroda et al. |
| 2005/0254386 | A1* | 11/2005 | Shavit et al. ............... 369/53.21 |

FOREIGN PATENT DOCUMENTS

| EP | 1102449 A2 | 5/2001 |
| JP | 07-182112 A | 7/1995 |
| JP | 11-250572 A | 9/1999 |
| JP | 2002-92894 A | 3/2002 |

(Continued)

OTHER PUBLICATIONS

Standard ECMS-359 "80 mm (1,46 Gbytes per slide) and 120 mm (4,70 Gbytes per slide) DVD Recordable Disk (DVD-R)" ECMA 1st Edition, Dec. 2004, pp. 44-51.

(Continued)

*Primary Examiner* — Joseph Haley
*Assistant Examiner* — Carl Adams
(74) *Attorney, Agent, or Firm* — Birch, Stewart, Kolasch & Birch, LLP

(57) ABSTRACT

Content information (CI) is recorded, and then control information including an encryption key is recorded. The area in which the content information (CI) is written is shifted with respect to the user area (UIA) in a playback-only disc. The control information (SI) is written with an identical shift. As a result of the shift, content information (CI) or dummy data (DD) is written in the area (SIA) in which control information is recorded in a playback-only disc. Information indicating the value of the shift is selected randomly and deleted when the disc is removed from the recording apparatus. When encrypted content is downloaded and recorded on a recordable optical disc, the complete content can be recorded on the disc correctly just once.

24 Claims, 11 Drawing Sheets

(56) References Cited

FOREIGN PATENT DOCUMENTS

| | | |
|---|---|---|
| JP | 2004-507124 A | 3/2004 |
| JP | 2005-38458 A | 2/2005 |
| JP | 2004-350150 A | 12/2009 |
| TW | 346571 | 12/1998 |
| TW | 401573 | 8/2000 |
| TW | 548542 | 8/2003 |
| TW | 569207 | 1/2004 |
| TW | I234367 B | 6/2005 |
| TW | 200617709 A | 6/2006 |
| WO | WO-95/18443 A1 | 7/1995 |
| WO | WO-01/78303 A1 | 10/2001 |

OTHER PUBLICATIONS

Standard ECMA-267 "120 mm DVD-Read-Only Disk" ECMA, 3rd Edition, Apr. 2001: pp. 32-37.

Toshiba Review "Content Delivery System Using DVD Recorders" vol. 60, No. 2, 2005: pp. 50-53.

* cited by examiner

FIG.2

| POSITION ON DISC | | | RECORDED DATA | |
|---|---|---|---|---|
| RADIAL POSITION | AREA | PHYSICAL ADDRESS | SECTOR NO. | CONTENT |
| INNER CIRCUMFERENCE | | | | PADDING DATA-1 PD1 |
| | | ⟩ 02EFFFh | ⟩ ←--- 02EFFFh | |
| | | 02F000h | ←--- 02F000h | REFERENCE CODE RC |
| | | ⟩ 02F01Fh | ⟩ ←--- 02F01Fh | |
| RIA | SIA | 02F020h | ←--- 02F020h | PADDING DATA-2 PD2 |
| | | SDA ⟩ 02F1FFh | ⟩ ←--- 02F1FFh | |
| | | 02F200h | ←--- 02F200h | CONTROL DATA SD |
| | | ⟩ 02FDFFh | ⟩ ←--- 02FDFFh | |
| | | 02FE00h | ←--- 02FE00h | PADDING DATA-3 PD3 |
| 24.000mm | | ⟩ 02FFFFh | ⟩ ←--- 02FFFFh | |
| | | 030000h | ←--- 030000h | CONTENT INFORMATION CI |
| | UIA | ⟩ | ⟩ | |
| | | | | CONTENT INFORMATION CI |
| | | ⟩ 26DBAFh | ⟩ ←--- 26DBAFh | |
| 58.000mm | ROA | 26DBB0h ⟩ | ←--- 26DBB0h ⟩ | PADDING DATA-4 PD4 |

OUTER CIRCUMFERENCE

FIG.3

| POSITION ON DISC | | | RECORDED DATA | |
|---|---|---|---|---|
| RADIAL POSITION | AREA | PHYSICAL ADDRESS | SECTOR NO. | CONTENT |
| INNER CIRCUMFERENCE | | | | |
| | SIAa | 02DFFFh <br> 02E000h ⟵ <br> 02E01Fh <br> 02E020h ⟵ <br> SDAa 02E1FFh <br> 02E200h <br> 02EDFFh <br> 02EE00h ⟵ <br> 02EFFFh | ⟵ 02EFFFh <br> ⟵ 02F000h <br> ⟵ 02F01Fh <br> ⟵ 02F020h <br> ⟵ 02F1FFh <br> ⟵ 02F200h <br> ⟵ 02FDFFh <br> ⟵ 02FE00h <br> ⟵ 02FFFFh | PADDING DATA-1 PD1 <br> REFERENCE CODE RC <br> PADDING DATA-2 PD2 <br> CONTROL DATA SD <br> PADDING DATA-3 PD3 |
| UIAa | SIA <br> SDA | 02F000h <br> 02F01Fh <br> 02F020h <br> 02F1FFh <br> 02F200h <br> 02FDFFh <br> 02FE00h <br> 02FFFFh <br> 030000h | ⟵ 030000h | CONTENT INFORMATION CI |
| 24.000mm | UIA | 26CBAFh <br> 26CBB0h | ⟵ 26DBAFh <br> ⟵ 26DBB0h | CONTENT INFORMATION CI |
| 58.000mm | | 26DBAFh <br> 26DBB0h | | PADDING DATA-4 PD4 |
| OUTER CIRCUMFERENCE | | | | |

FIG.9

| POSITION ON DISC ||| RECORDED DATA ||
|---|---|---|---|---|
| RADIAL POSITION | AREA | PHYSICAL ADDRESS | SECTOR NO. | CONTENT |
| INNER CIRCUMFERENCE | | | | |
| | | 02EFFFh | ←--- 02CFFFh | PADDING DATA-1 PD1 |
| | | 02F000h | ←--- 02D000h | |
| | | 02F01Fh | | DUMMY DATA DD |
| | SIA | 02F020h | | |
| | | 02F1FFh | | |
| | | 02F200h | | |
| | | 02FDFFh | | |
| | | 02FE00h | | |
| | | 02FFFFh | ←--- 02DFFFh | |
| 24.000mm | | 030000h | ←--- 02E000h | PADDING DATA-1a PDa1 |
| | | 030FFFh | ←--- 02EFFFh | |
| | | 031000h | ←--- 02F000h | REFERENCE CODE RC |
| | UIA | 03101Fh | ←--- 02F01Fh | |
| | | 031020h | ←--- 02F020h | PADDING DATA-2 PD2 |
| SIAd | | 0311FFh | ←--- 02F1FFh | |
| | | 031200h | ←--- 02F200h | CONTROL DATA SD |
| | | 031DFFh | ←--- 02FDFFh | |
| | | 031E00h | ←--- 02FE00h | PADDING DATA-3 PD3 |
| | | 031FFFh | ←--- 02FFFFh | |
| | | 032000h | ←--- 030000h | CONTENT INFORMATION CI |
| | | 26DBAFh | | |
| | UIAd | 26DBB0h | | |
| 58.000mm | | | | CONTENT INFORMATION CI |
| | | 26FBAFh | ←--- 26DBAFh | |
| | | 26FBB0h | ←--- 26DBB0h | PADDING DATA-4 PD4 |
| OUTER CIRCUMFERENCE | | | | |

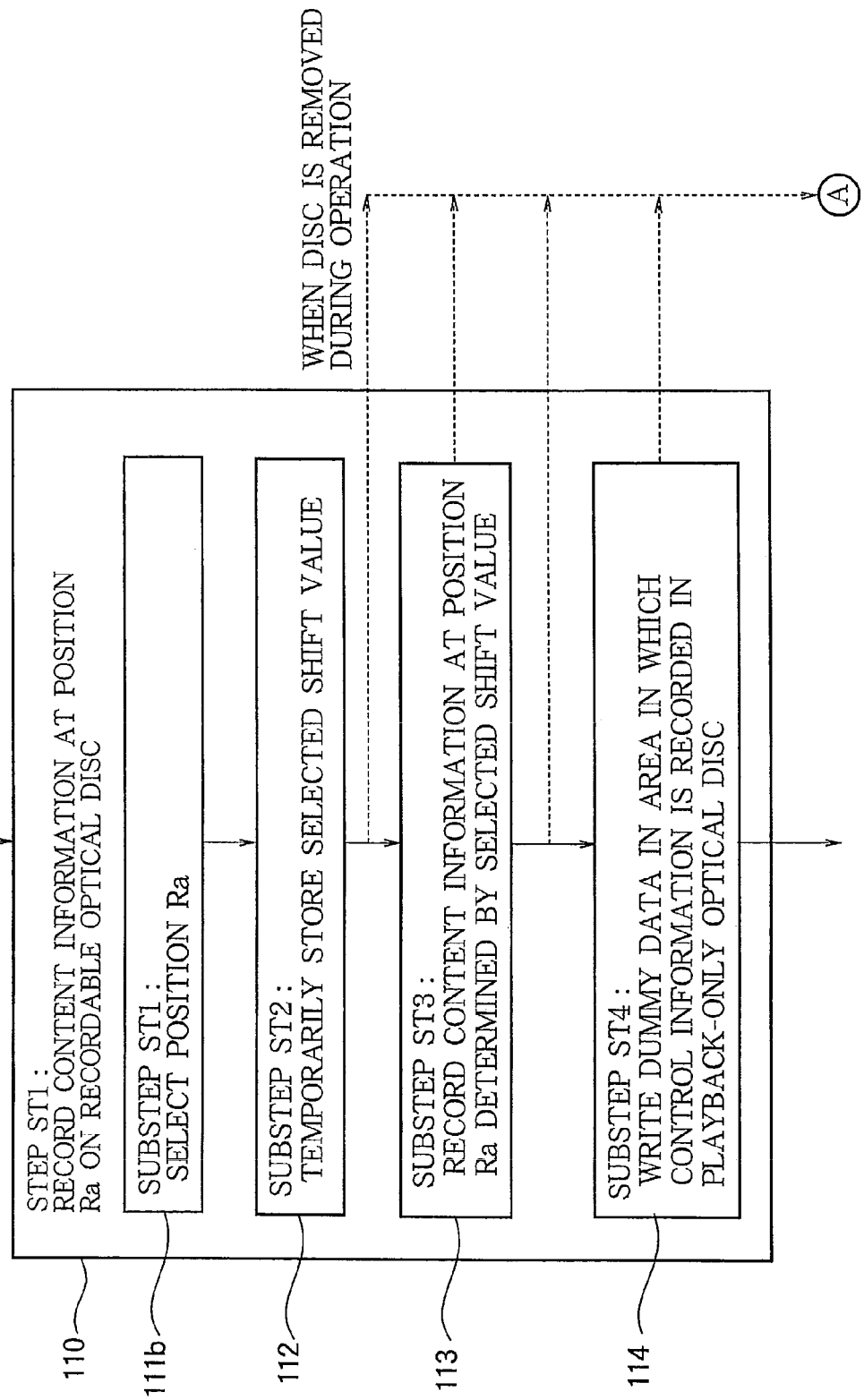

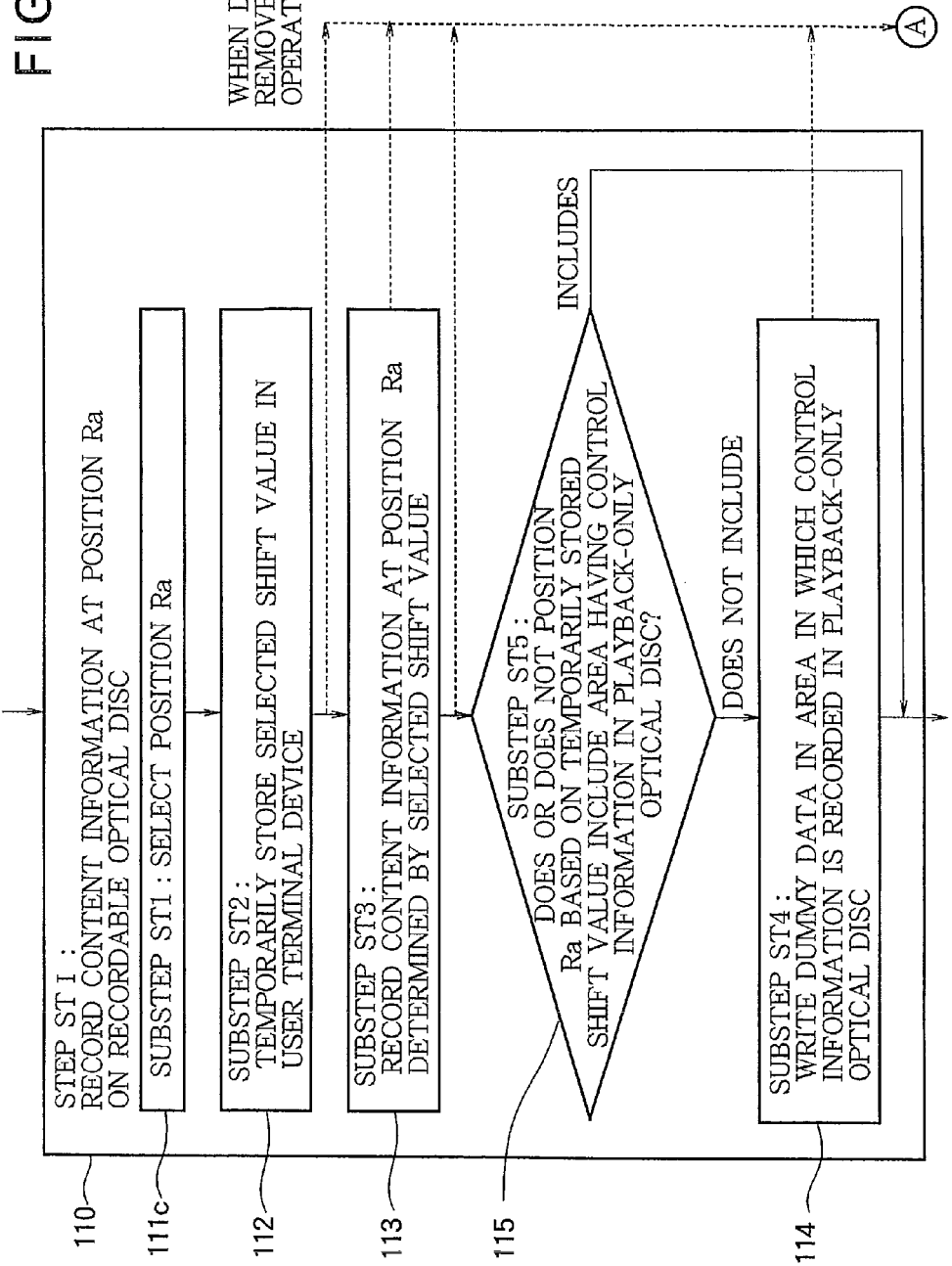

INFORMATION RECORDING METHOD AND APPARATUS, INFORMATION RECORDING MEDIUM, AND INFORMATION RECORDING MEDIUM MANUFACTURING METHOD AND APPARATUS

TECHNICAL FIELD

The present invention relates to an information recording method and apparatus and an information recording medium used to record video, music, or other digital content distributed from a server via a network or other communication means to an information terminal to be downloaded and recorded onto an optical disc, and to a method and an apparatus for manufacturing the information recording medium.

BACKGROUND ART

At present, video, music, and other digital content are distributed on DVDs or other playback-only optical discs (see, for example, non-patent document 1). In a new form of content distribution now under study, a content provider places content in a server, users who wish to purchase the content access the server through a communication means such as the Internet, and the purchased content is downloaded through the communication means to a user terminal and recorded on a recording medium such as a DVD-R at the user terminal. In some exemplary DVD cases, the disc on which the downloaded content is recorded can be reproduced by a DVD player (see, for example non-patent document 2).

Streaming and downloading distribution systems for viewing or listening to content placed on a server by accessing the server through communication means are already in use. In these distribution systems, the user can view or listen to the distributed content freely up to a number of times agreed to in a contract at the time of purchase of the content, or during a contracted period of time (see, for example patent document 1). However, the content can only be reproduced on a dedicated reproduction system; it cannot be recorded and saved onto a removable medium such as an optical disc, and the user cannot view or listen to the content free of time period restrictions or playback count restrictions.

To compare the former with the latter, that is, to compare the download recording of content onto an optical disc with the streaming distribution or download distribution of the content, when the user views or listens to the content, in the latter case the user can generally perform only simple operations on the content, such as fast-forward, rewind, slow play, and pause.

In the former case, the content downloaded and recorded on the disc is identical to authored content provided on playback-only optical discs, so the same elaborate user interface can be used as for content distributed on playback-only optical discs. For example, in playback-only DVD-Video, the content may be divided into chapters, and a list of images representing the chapters may be displayed on a menu screen from which the user can select what to reproduce, or the user may be able to select one of several languages or subtitles, or conduct various other operations by using a remote control to select buttons displayed on the screen. It would be desirable for content downloaded and recorded on a disc to have equivalent functionality and convenience.

Together with convenience, copyright protection of content is also important, and functions for preventing illegal copying are also now under study. In both of the methods described above, however, copyright protection is focused on enhanced encryption or enhanced encryption management (see patent document 2, for example); no method of preventing illegal copying by a combination of the data structure of the content and the disc structure has been presented so far.

Patent document 1: PCT Patent Application, Japanese-language Publication No. 2004-507124

Patent document 2: Japanese Patent Application Publication No. 2004-350150

Non-patent document 1: Standard ECMA-267, ECMA, 2001, pp. 32-37

Non-patent document 2: Toshiba Review, Vol. 60, No. 2, pp. 50-53, 2005

DISCLOSURE OF THE INVENTION

Problems to be Solved by the Invention

When content is downloaded through communication means, the data transfer rate and the continuity and reconnectability of communication pose constraints. During the recording of downloaded content onto a disc, deteriorating communication quality may lower the transfer rate or interrupt the transfer, or at the user's end, the disc on which the content is being recorded may have a defect, the recording apparatus may suffer a mechanical shock during the recording operation, or other unforeseen adverse circumstances may arise. Especially when a user downloads and records content for a fee, it is necessary to prevent the recording from failing, even if the recording onto one disc fails due to accidents such as the above. That is, if recording on one disc fails, it is necessary for the user to be able to replace the disc and record all the downloaded content on a new disc with no additional fee.

For the content provider, it is also necessary to deal with piratical attempts to make illegal copies of content that was downloaded for a fee. In the illegal copying of conventional playback-only optical discs, the threat has been such piratical acts as copying the digital data on a disc protected by a copyright protection technique such as encryption to another disc, or illegally breaking the encryption code and extracting digital data stripped of copyright protection, which data may then be copied without restriction.

In the download recording of content dealt with by the present invention, there is also a new threat to be considered, namely, illegal copying by abuse of the above-mentioned measures to deal with disc recording failure. For example, there is the possibility that even when recording on one disc ended successfully, success might be disguised as failure and the content might be illegally recorded again on a second disc, or recording might be intentionally interrupted and the unsuccessfully recorded disc might then be copied, and a repair process might be carried out on such discs to turn them into discs that can be reproduced normally, thereby obtaining illegal extra copies.

The present invention addresses the above situation with the object of providing an information recording method and information recording apparatus that, in the download recording of content to a recordable disc, record the complete content correctly on a disc just once, and create a disc that can be played on a reproducing apparatus for playback-only discs.

Another object of the invention is provide an information recording method and information recording apparatus that can exclude the playing, by the reproducing apparatus, of a disc on which recording failed during download recording, even if a repair process is carried out afterward.

Means of Solution of the Problems

The information recording method according to the invention is an information recording method for recording downloaded data, downloaded from a server and received by an information terminal device, on a recordable optical disc by means of a recording apparatus with which the information terminal device is equipped, and thereby providing an information recording medium reproducible by a reproducing apparatus for a prescribed playback-only optical disc, the downloaded data comprising control information including a content encryption key and content information including data encrypted using the encryption key; the information recording method comprises:

a first step of recording the content information in a first prescribed position on the recordable optical disc; and a second step of recording the control information in a second prescribed position on the recordable optical disc, after the first step;

the first step having a substep of selecting a shift value for shifting the first prescribed position within a prescribed range with respect to physical addresses of an area in which the content information is recorded in the playback-only optical disc, a substep of temporarily storing the selected shift value in the information terminal device, and a substep of recording the content information in the first prescribed position determined by the selected shift value;

the second step determining the second prescribed position as a position shifted by an amount identical to the temporarily stored shift value with respect to physical addresses of an area in which the control information is recorded in the playback-only optical disc, and recording the control information in the second prescribed position; and a step of deleting the temporarily stored shift value when the optical disc is removed from the recording apparatus after the first step begins.

The information recording apparatus according to the invention is an information recording apparatus for recording downloaded data downloaded from a server on a recordable optical disc and thereby providing an information recording medium reproducible by a reproducing apparatus for a prescribed playback-only optical disc, the downloaded data comprising control information including a content encryption key and content information including data encrypted using the encryption key; the information recording apparatus comprises:

a recording apparatus for recording the downloaded data downloaded from the server on the recordable optical disc; and a communication and control apparatus for making the recording apparatus record the content information in a first prescribed position on the recordable optical disc and record the control information in a second prescribed position on the recordable optical disc after the content information has been recorded; wherein the communication and control apparatus selects a shift value for shifting the first prescribed position within a prescribed range with respect to physical addresses of an area in which the content information is recorded in the playback-only optical disc, temporarily stores the selected shift value in a memory in the information recording apparatus, and causes the content information to be recorded in the first prescribed position determined by the selected shift value, determines the second prescribed position as a position shifted by an amount identical to the temporarily stored shift value with respect to physical addresses of an area in which the control information is recorded in the playback-only optical disc, and causes the control information to be recorded in the second prescribed position, and deletes the temporarily stored shift value from the memory when the optical disc is removed from the recording apparatus after recording of the content information begins.

The information recording medium according to the invention is a medium on which content information and control information have been recorded by the above information recording method or apparatus.

The information recording medium manufacturing method according to the invention is a method that manufactures an information recording medium on which content information and control information have been written by the above information recording method.

The information recording medium manufacturing apparatus according to the invention is an apparatus that manufactures an information recording medium on which content information and control information have been written by the above information recording apparatus.

Effect of the Invention

In the download recording of encrypted content to a recordable optical disc according to the present invention, the complete content can be recorded correctly on a disc just once, creating an optical disc that can be played by a reproducing apparatus for playback-only optical discs.

It is also possible to avoid having a disc on which recording failed during download recording illegally copied, or altered into a playable disc by repair processing carried out afterward.

An optical disc, which is an information recording medium, that has been recorded on by the information recording method and information recording apparatus according to the invention, while fulfilling the function of avoiding illegal copying during recording, can store encrypted content and, after recording, can be played by existing reproducing apparatus.

BRIEF DESCRIPTION OF THE DRAWINGS

FIG. 2 is a map of areas on a playback-only optical disc.

FIG. 3 is a map of areas recorded on an optical disc by the information recording method according to the first embodiment of the invention.

FIG. 9 is a map of areas recorded on an optical disc by the information recording method according to the second embodiment of the invention.

FIG. 10 is a flowchart illustrating processing carried out in the second embodiment in place of the processing in FIG. 6 in the first embodiment.

FIG. 11 is a flowchart illustrating processing carried out in a third embodiment in place of the processing in FIG. 6 in the first embodiment.

Figure 1:
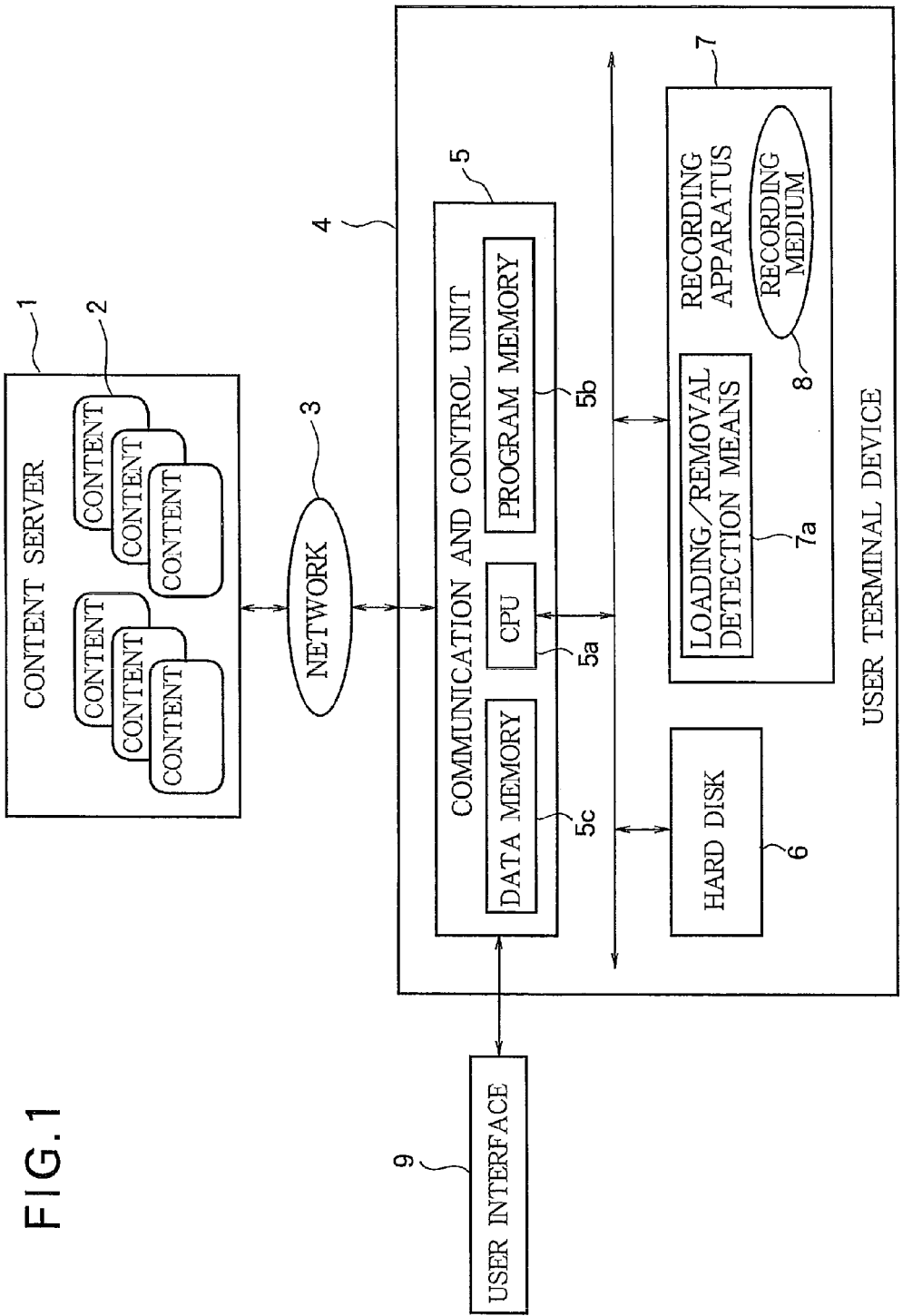
FIG. 1 is a block diagram showing the structure of an information recording apparatus according to a first embodiment of the invention.

EXPLANATION OF REFERENCE CHARACTERS 1 content server, 2 content, 3 network, 4 user terminal device, 5 communication and control unit, 5c data memory, 6 hard disk, 7 recording apparatus, 7a loading/removal detection means, 8 recording medium, 9 user interface.

BEST MODE FOR CARRYING OUT THE INVENTION

First Embodiment

The information recording method and information recording apparatus according to the first embodiment of the invention download content information from a content server, on which video, audio, or other digital content is stored, through a communication channel such as the Internet to an information terminal device, e.g., a terminal device located at hand to a user, record the digital content on an information recording medium, e.g., a recordable optical disc, and create a disc that can be played by, for example, an optical disc reproducing apparatus in the possession of the user. Particular features, for an information recording apparatus, are increased compatibility with existing optical disc reproducing apparatus and, for content protected by copyright, enhanced functions for preventing illegal copying and preventing the circumventing of copyright protection in information terminal apparatus.

FIG. 1 is a block diagram showing the overall structure of a content download recording system applied in the first embodiment of the invention. As shown, the download recording system of the first embodiment comprises a content server 1 that stores a plurality of content 2 supplied by a content provider for download distribution, a network 3 that is used as a communication means for download distribution, and an information terminal apparatus, for example a user terminal device 4, that receives content downloaded via the network 3.

The user terminal device 4 includes a communication and control unit 5 that communicates with the network 3 to specify content desired by the user from among the content 2 stored in the content server 1 and performs control to record the downloaded content, a recording apparatus 7 that stores the downloaded content on a recording medium 8, and a hard disk 6 that records the downloaded content in a buffer in the user terminal device 4 as necessary. In this example, the recording medium 8 is a recordable optical disc. The communication and control unit 5, which also controls the user terminal device as a whole, has at least a CPU 5a and a program memory 5b, and performs its functions by software, that is, it functions as a CPU controlled by programs stored in the program memory. The communication and control unit 5 also has a data memory 5c, which temporarily stores data generated during operation.

The recording apparatus 7 carries out recording in a data format that makes the recorded recordable disc, e.g., a recordable optical disc such as a DVD-R, playable by reproducing apparatus for a prescribed recordable optical disc, in this case, for example, by a DVD player. Specifically, since the DVD-Video format can be played on all types of DVD players, if the downloaded content is recorded on a DVD-R in the DVD-Video format, it can be reproduced on any DVD player.

The recording apparatus 7 includes a loading/removal detection means 7a that detects insertion and removal of the recording medium 8.

For example, the user interface 9, when operated by the user of the user terminal device 4, sends control commands to the communication and control unit 5. These control commands include instructions to select content, start download (recording), eject the recording medium 8, and so on.

As a whole, the user terminal device 4 has the function of recording downloaded information, and is referred to as an information recording apparatus.

To take matters in order, the data format of a recordable optical disc will now be described. Content with high commercial value must be protected from illegal copying or alteration, so copyright protection techniques are employed. Content stored in the DVD-Video format on a playback-only optical disc is protected by a copyright protection technique known as CSS. In CSS, a prescribed portion of the content is scrambled, i.e., encrypted, by an encryption key called a title key, and the encrypted portion and the title key are recorded on the disc. The title key is not recorded as is, however; it is encrypted by another encryption key called a disc key and is then recorded, which makes copyright protection possible. Therefore, in order to play the content, it is necessary to decrypt the title key using the disc key, and then to decrypt the scrambled content using the decrypted title key. The disc key is encrypted by another means and recorded as a part of the control data in the control information area on the disc, so that it cannot be read directly by the user. The encrypted disc key recorded in the control data can be decrypted by a device designed by legally obtaining certain secret information needed for decryption.

FIG. 2 shows a map of areas on a DVD-Video disc, which is a playback-only optical disc. On the disc, a single spiral recording track runs from the inner to the outer circumference of the disc, and to facilitate access to the recorded data, the track is divided into sectors of a prescribed length for storing 2418 bytes. Each sector is assigned a 24-bit binary sector number as a physical address indicating the position on the disc, sequentially in ascending order from the inner to the outer circumference. A user information area UIA is located outward of the 24.000 mm radial position. The first sector in the user information area UIA has sector number 030000h (h indicating a hexadecimal number). All content information CI, including the file system, is recorded in the user information area UIA.

The user information area UIA ends at the final sector of the content information CI; outward thereof lies the lead-out area ROA. The sectors in the lead-out area ROA contain no meaningful data other than the sector numbers by which the optical head determines its position during access to the area.

The part of the disc inward of the 24.000 mm radial position is defined as the lead-in area RIA, the sector number of the final sector of which (and accordingly of the last sector of the recorded lead-in area RIA) is 02FFFFh. The lead-in area RIA contains information needed by a reproducing apparatus to drive the disc, control data SD in which the encrypted disc key is recorded as noted above, and other information. The sectors in which the control data SD is recorded have sector numbers 02F200h to 02FDFFh. The control information area SIA comprises the sectors having sector numbers 02F000h to 02FFFFh, which also include the sectors of the reference code RC, padding data-2 (PD2), control data CD, and padding data-3 (PD3).

The reference code RC is a part of the information the reproducing apparatus needs to drive the disc.

The padding data is an area, specified by the standard, having data with values of, for example, 00h. Alternatively, the data may have an arbitrary value other than 00h.

When a playback-only DVD-Video disc is fabricated, first, after authoring of the content, the disc is processed according to the data format of the sectors to be recorded on the disc, including the sector numbers, and the sector data of the lead-in area RIA, including the control information area SIA, and the lead-out area ROA are concatenated to form a data sequence aligned on the single recording track. The sectors in the control information area SIA have sector numbers 02F000h to 02FFFh and the sectors in the user information area UIA which records content information CI have sector numbers 030000h and above. Therefore, the control information area SIA on a playback-only DVD-Video disc has sector numbers 02F000h to 02FFFFh, while the user information area UIA has sector numbers 030000h or above. In a playback-only disc, the physical addresses indicating position on the disc and the sector numbers of the data recorded in the sectors are completely identical.

A DVD player that plays a DVD-Video disc is a reproducing apparatus designed to play playback-only DVD-Video discs. Therefore, the DVD player reads the data to be reproduced on the assumption that the content information is stored in the sectors with sector numbers 030000h and above, and the control data SD in which the disc key is recorded are stored in the sectors with sector numbers 02F200h to 02FDFFh.

Next we proceed to the recording of downloaded content. The recordable optical disc, such as a DVD-R, on which the downloaded content data will be recorded is blank before the data are recorded. On a blank disc, a spiral guiding groove that will become the single recording track is formed from the inner to the outer circumference, and physical addresses indicating the position on the disc are furnished as embossed pits on the groove. The physical address indicates the sector number of the sector that would normally be recorded at that position. The sector size is the prescribed length for holding 2418 bytes data, the same as on a playback-only optical disc. The part of the recording track in which the sector at radial position 24.000 mm on the disc will be recorded has physical address 030000h.

The above content information and control data are recorded on the blank disc. At the beginning of the data of each sector, the sector number is recorded. When the shift proposed by this invention is not carried out, the data of each sector are recorded on the sector with the same physical address as the sector number of that sector. During playback, the sector number recorded in the sector is referred to and the physical address is not referred to. When content information is recorded outward from the position with physical address 030000h, the DVD player that subsequently plays back the recorded disc interprets that portion as the user information area UIA having sector numbers beginning from 030000h. Similarly, when control data SD is recorded at positions with physical addresses 02F200h to 02FDFFh, the DVD player that plays back the recorded disc interprets that portion as the control data area SDA having sector numbers from 02F200h to 02FDFFh.

The acquisition of additional copies of content under the guise of unsuccessful disc recording has been pointed out as a new threat in the download distribution of content. Next, the specific threat and preventive measure against it will be described.

When content is downloaded and recorded from a server to a user terminal device and recorded on a DVD-R disc, it is contemplated that the recording on the disc at the user terminal device might be intentionally stopped short of completion to cause a recording failure, the disc might be replaced by a new blank disc, and a request for retransmission of the content might be sent to the server.

Here a case will be considered in which, for example, recording on a DVD-R disc is designed to be carried out starting from the lead-in area RIA and proceeding outward in sequence through the user information area UIA and the lead-out area ROA. If recording is interrupted at the point where it has just entered lead-out area ROA, the control information including the disc key and the content information have already been recorded on the disc. Therefore, by supplementary recording of the lead-out area (ROA) using separate recording apparatus, a disc playable on a DVD player can be obtained. If a request to the server for retransmission of the content is accepted, the same content will be recorded again on a new DVD-R disc.

When the recording of paid content fails, retransmission of the content for recording on a new disc is a natural request for the user to make, so it cannot be denied, but abuse by the method described above can cause the content provider to suffer a great loss.

As a countermeasure, it would be conceivable, for example, to have the recording onto the DVD-R disc designed to start from the user information area UIA, proceed outward through the lead-out area ROA, and end with recording in the lead-in area RIA. Since control data SD (or the information in the control information area SIA, including the control data SD) containing a disc key is recorded last, even if recording is intentionally stopped short of completion and disguised as a recording failure, since recording on the disc has been interrupted before the recording of the control information area SIA, the content cannot be reproduced by a DVD player, so this countermeasure would be effective.

However, it would still be possible to take the DVD-R disc on which the recording of the retransmitted content has successfully been completed, read data from the lead-in area RIA of that completely recorded disc, and record it on the disc on which recording was intentionally interrupted previously so that the lead-in area RIA or the control information area SIA forming part of RIA was left unrecorded, thereby altering the disc into a disc that is perfectly playable on a DVD player. The result would again be to allow illegal copying of downloaded content.

This problem is avoided in the present invention by shifting the relationship between the physical addresses given by the embossed pits on the blank DVD-R disc and the sector numbers of the sectors in which content information or information SI such as control data in the control information area is recorded at those physical addresses, and changing the order of recording of the user information area UIA and control information area SIA. A shift value representing the shift direction and magnitude (absolute value) is determined in such a way that it cannot be easily inferred or predicted by historical analysis; for example, the shift value may be determined by generating a random number or the like within a prescribed range.

FIG. 3 is a map of areas recorded on an optical disc by the information recording method according to the first embodiment of the invention when the shift value is −1000h. As shown by a comparison with FIG. 2, the sectors of content information CI having sector numbers 030000h to 26DBAFh, which are data that would normally be recorded in the sectors with physical addresses 030000h to 26DBAFh (the area UIA in which content information is recorded in a playback-only optical disc), are recorded in the sectors with physical addresses 02F000h to 26CBAFh (an area UIAa that is shifted by −1000h with respect to area UIA) in this embodiment, shifting the physical addresses by −1000h. That is, the position on the disc at which the content information is recorded is shifted inward by 1000h sectors (4096 sectors). The sector number 26 DBAFh at the end of the content information is only an example; in general it will vary depending on the length of the content. In the following description, the number of sectors of the shift, including the direction of shift, will be referred to as the 'shift value'. A negative shift value represents a shift toward the inner circumference.

Similarly, the control data SD have 02F200h to 02FDFFh as sector numbers; these are the data that are normally recorded in the sectors with physical addresses 02F200h to 02FDFFh (the area SDA in which control data are recorded in a playback-only optical disc), but in the present embodiment, the physical address is shifted by −1000h, and the data are recorded in the sectors with physical addresses 02E200h to 02EDFFh (an area SDAa shifted by −1000h with respect to area SDA). Similarly, the data SI in the control information area, including control data SD, are recorded in the sectors with physical addresses 02E000h to 02EFFFh (an area SIAa shifted by −1000h with respect to the area SIA in which control information is recorded in a playback-only optical disc).

As a result, content information CI is recorded in the sectors with physical addresses 02F200h to 02FDFFh in which data SI in the control information area would normally be recorded (in the area SIA in which control information is recorded in a playback-only optical disc).

Figure 4:
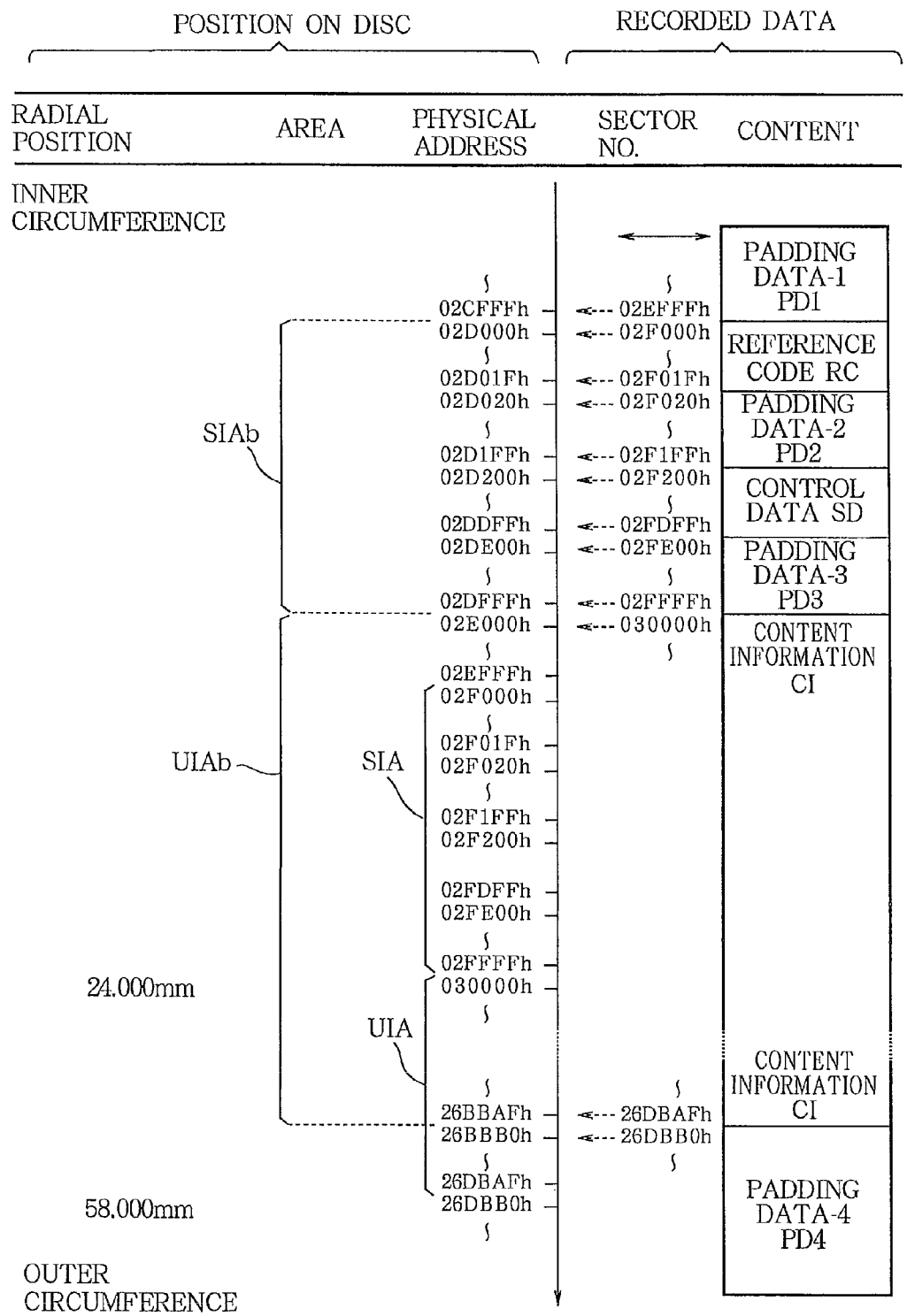
FIG. 4 is a map of areas recorded on an optical disc by the information recording method according to the first embodiment of the invention.

FIG. 4 is a map of areas recorded on an optical disc by the information recording method according to the first embodiment of the invention when the shift value is −2000h. In this example, the content information that would normally be recorded in the sectors with physical addresses 030000h to 26 DBAFh (the area UIA in which content information is recorded in a playback-only optical disc) is recorded in the sectors with physical addresses 02E000h to 26BBAFh (area UIAb, shifted by −2000h with respect to area UIA). The control information area data SI that would normally be recorded in the sectors with physical addresses 02F000h to 02FFFFh (constituting area SIA) is recorded in the sectors with physical addresses 02D000h to 02DFFFh (area SIAb, shifted by −2000h with respect to area SIA).

As a result, content information CI is recorded in the sectors with physical addresses 02F000h to 02FFFFh (in the area SIA on which control information is recorded in a playback-only optical disc), in which control information area data SI would normally be recorded.

Thus a feature of the first embodiment is that content information CI is recorded in the sectors with physical addresses 02F000h to 02FFFFh (the area SIA in which control information is recorded in a playback-only optical disc), in which control information area data SI would normally be recorded. The shift value is therefore equal to or less than −1000h (a negative number with an absolute value equal to or greater than 1000h).

Figure 5:
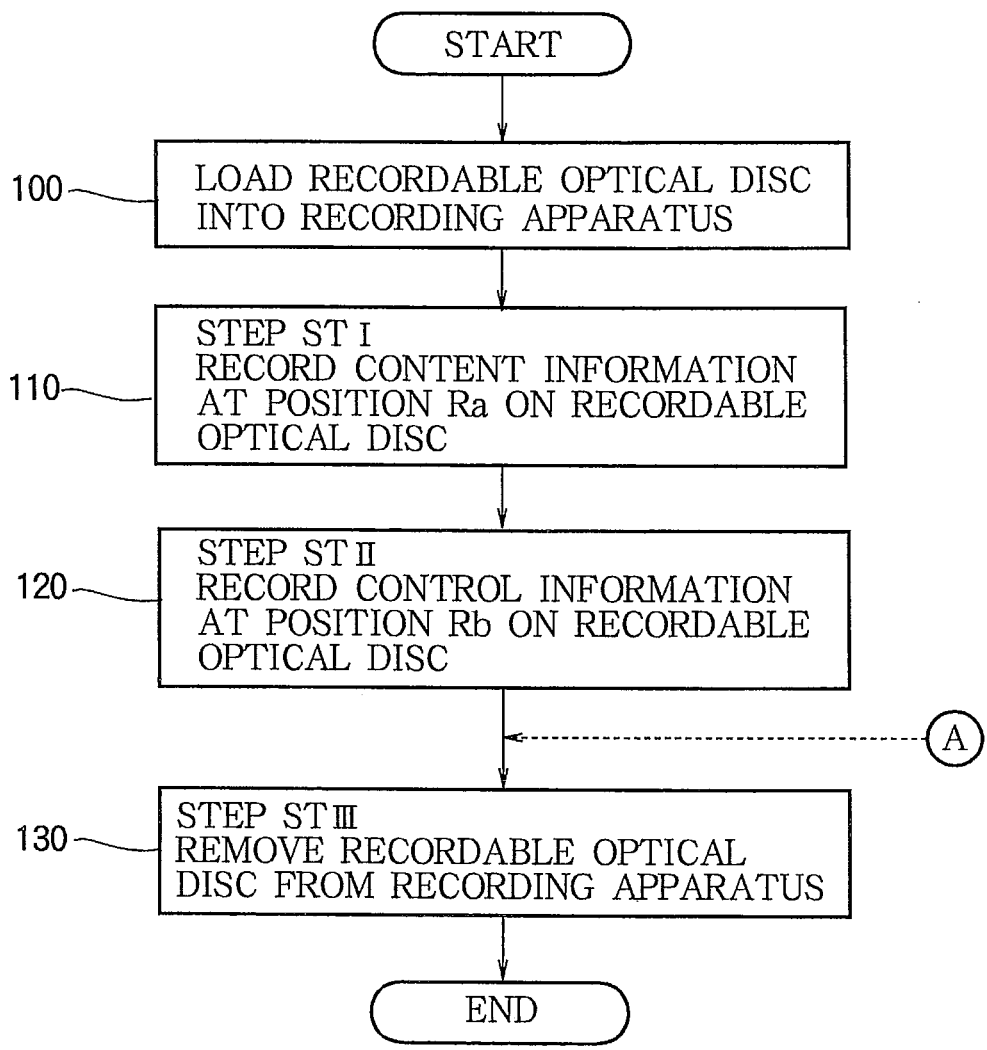
FIG. 5 is a flowchart illustrating a recording procedure in the information recording method according to the first embodiment of the invention.
Figure 6:
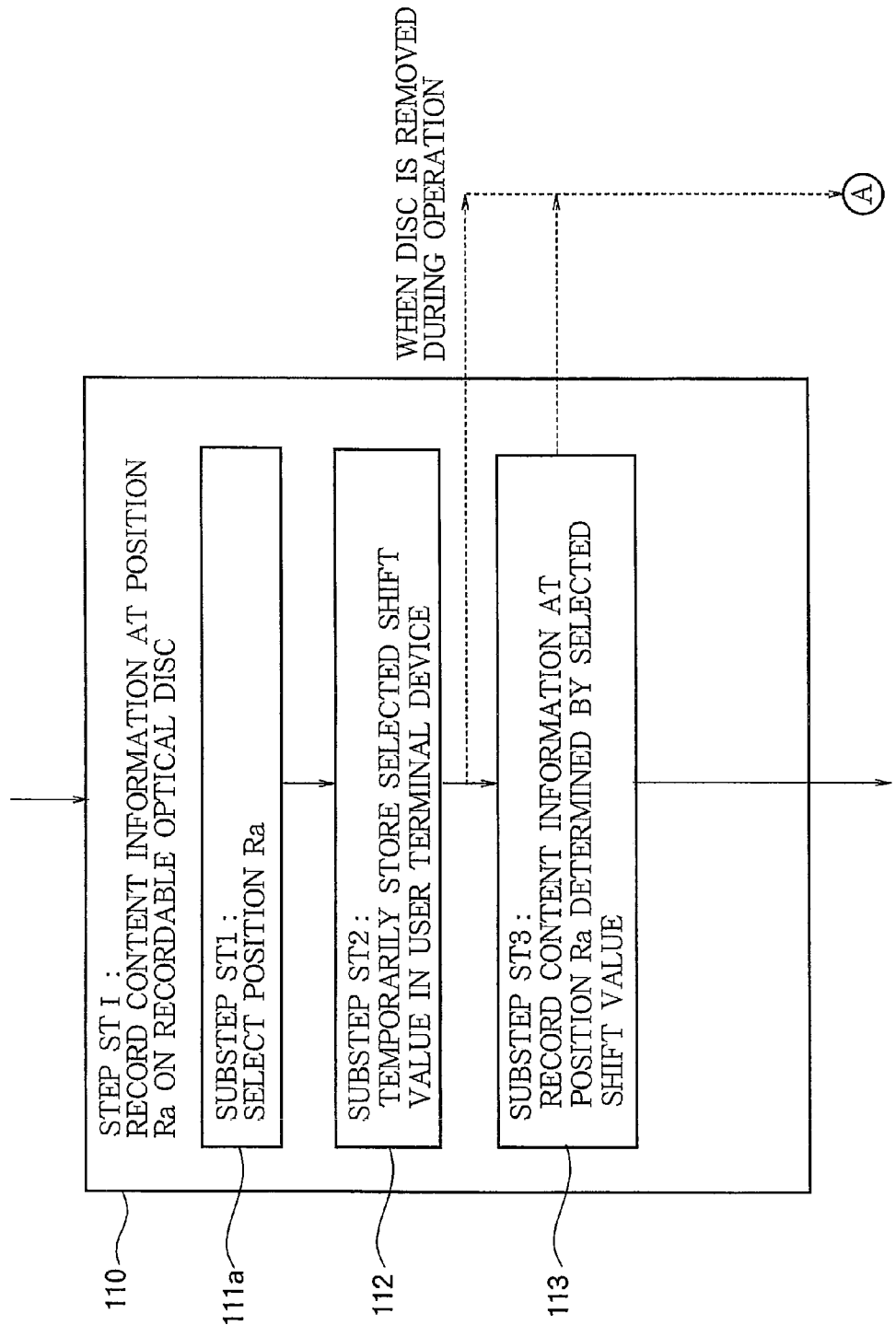
FIG. 6 is a flowchart illustrating details of step STI in FIG. 5.
Figure 7:
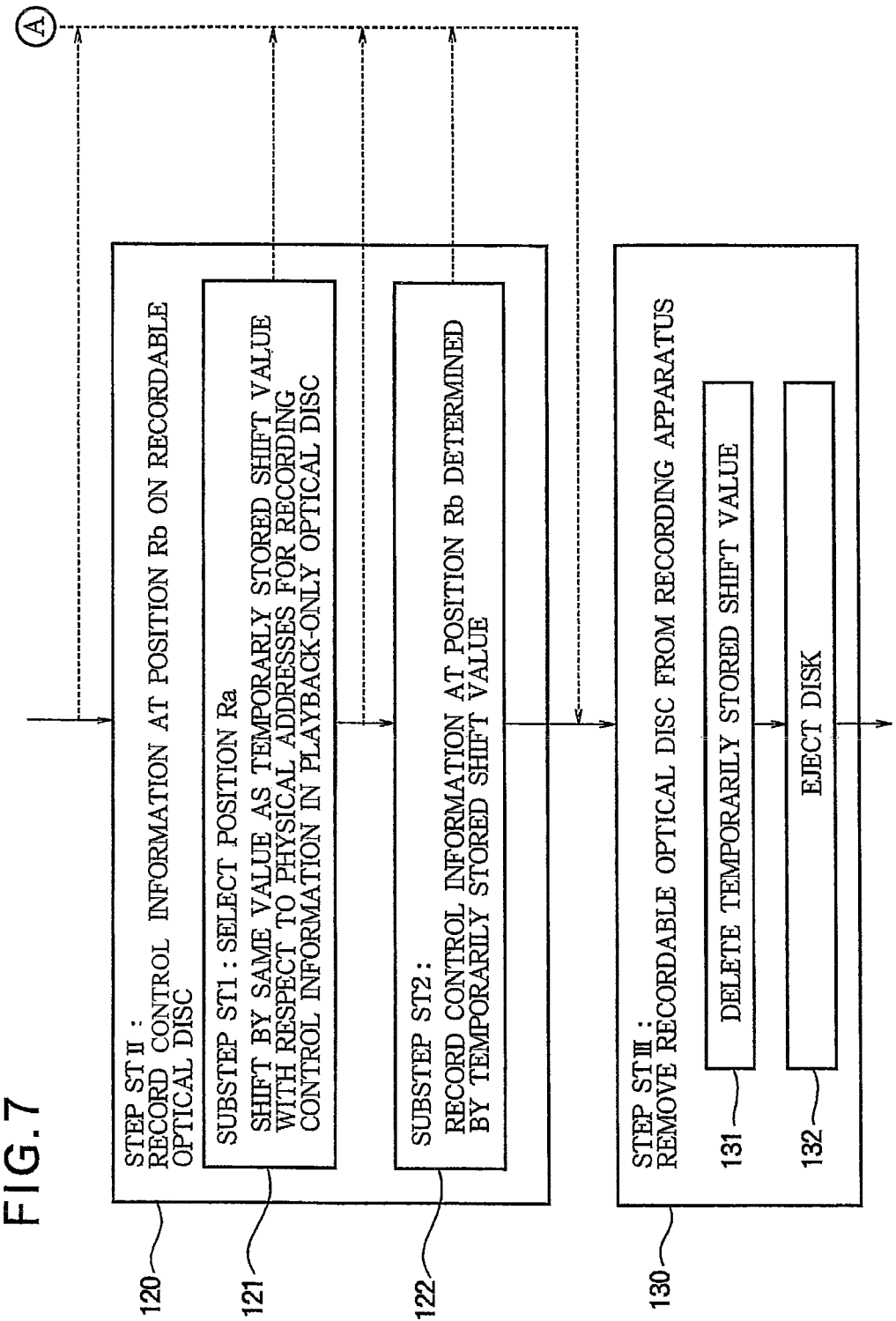
FIG. 7 is a flowchart illustrating details of step STII and step STIII in FIG. 5.

The recording procedure in the information recording method according to the first embodiment of the invention is illustrated in FIG. 5. FIG. 6 shows details of step STI (110) in FIG. 5; FIG. 7 shows details of step STII (120) and step STIII (130) in FIG. 5.

As shown in FIG. 5, when recording of downloaded content to a recording medium is carried out by the information recording method according to the first embodiment of the invention, after the recording medium 8 is loaded into the recording apparatus 7 (100), the following three major steps are carried out.

First, as step STI, the content information CI is recorded at a selected position Ra on the recording medium.

Next, as step STII, control information SI is recorded in a certain position Rb on the recording medium 8 (120), after the recording of the content information CI in step STI (after completion of the recording of the content information CI) (120).

Finally as step STIII, the recording medium 8 is removed from the recording apparatus 7 (130) after the recording of the control information in step STII (after completion of the recording of the control information CI) (130). Specifically, the recording medium 8 is ejected from the recording apparatus by an ejecting function that operates in response to an ejection request given by the user via the user interface 9. Alternatively, the recording medium 8 may be ejected automatically when recording finishes. Such automatic ejection is also called 'removal' herein.

When loading is carried out in step 100, this is detected by the loading/removal detection means 7a, and the detection result is conveyed to the recording apparatus 7. The process in step STI (110) is started in response to a content selection command and a command to start downloading (recording), given by operations performed by the user using the user interface 9; in step STI (110), first a position Ra for recording the content information is selected (111a) so as to satisfy a condition (3a) stated below and the following two conditions (1) and (2a), as shown in FIG. 6.

Condition (1) is that the selected position Ra (UIAa, UIAb) is shifted with respect to the physical addresses of the area UIA in which content information CI is recorded in a playback-only optical disc; condition (2a) is that the shift value must be selected so that the entire region SIA in which control information is recorded in a playback-only optical disc is included by the selected position Ra (UIAa, UIAb). The shift value is selected by, for example, random number generation within a range satisfying the above two conditions (1) and (2a) and the condition (3a) stated below.

Next, the selected shift value is temporarily stored (112) in the user terminal device 4, for example, in the data memory 5c in the communication and control unit 5, after which the content information is recorded at the position Ra determined from the selected shift value (113).

In step STII (120), as shown in FIG. 7, first the position Rb for recording the control information SI is determined by shifting by the same shift value as temporarily stored in step STI with respect to the physical addresses of the area SIA for recording control information SI in a playback-only optical disc (121), and then the control information SI is recorded at the position Rb (area SIAa or SIAb) determined from the temporarily stored shift value (122).

Thus content information CI is recorded first, control information SI is recorded next, and then the recording medium 8 is removed from the recording apparatus 7 in step STIII (130), but in this step, first the temporarily stored shift value is deleted (131) and then the disc is ejected (132).

The deletion of the shift value is performed not only when the steps STI (110) and STII (120) shown in FIGS. 5, 6, and 7 are carried out to completion but also when the disc 8 is removed after the shift value is stored in substep (112) of step STI in FIG. 6. This is indicated by dotted lines in FIGS. 5, 6, and 7.

The deletion of the shift value (131) is performed by the communication and control unit 5, and may be carried out when an ejection command is received from the user interface 9, when a control signal for ejection is generated by the communication and control unit 5, or when the generated signal is sent from the communication and control unit 5 to the recording apparatus 7. In either case, the deletion is preferably carried out before ejection of the disc as shown in FIG. 7, but alternatively, it may be carried out when the loading/removal detection means 7a detects that the recording medium 8 has been removed.

In the above description, the shift value is deleted when the recording medium 8 is removed after temporary storage of the shift value in substep ST2 (112); in other words, after the start of recording of the content information, the shift value is deleted when the recording medium 8 is removed.

At the beginning of step STI, content information CI is recorded in the sectors with physical addresses 02F000h to 02FFFFh (the area in which control information area data SI would be recorded by the normal recording method (when no shift is performed), in other words, the area SIA in which content information is recorded in a playback-only optical disc).

Consequently, if the disc 8 is removed from the recording apparatus 7 in the interval following the recording of the content information CI and preceding the completion of recording on the disc, it becomes impossible to record control information SI afterward. This is because content information CI has been recorded in the sectors with physical addresses 02F000h to 02FFFFh (the area SIA in which control information SI is normally recorded), so it is not clear where the control information area data SI that would normally be recorded in this area SIA should be recorded.

When the disc is used correctly and is not removed partway through the operation, since the shift value is stored in the user terminal device 4, the control information area data SI can be recorded normally by shifting, in the next step STII, the recording position of the control information area data SI by the same amount as the recording position of the content information CI was shifted by, and the positional relationship between the recorded control information area and the content information on the disc can be made the same as the positional relationship in a playback-only optical disc. Whether the disc is a playback-only optical disc or a recorded recording medium, a reproducing apparatus for reproducing playback-only optical discs, that is, a DVD player, detects only the written sector numbers, so even if the sector numbers do not match the physical addresses, no problem occurs during playback.

If the shift value is retained only while the disc 8 is loaded, once the disc is removed from the recording apparatus, the shift value can never be known again. When a normal recording apparatus records in a non-recorded area of a recordable optical disc, it detects position by reading the physical addresses on the disc, recognizes the sector having a physical address that matches the sector number of the data to be recorded as the sector in which the data are to be recorded, and executes the recording process. Accordingly, if the physical addresses and the sector numbers of the sectors to be recorded are shifted, normal recording becomes impossible.

It is thus possible to prevent supplementary recording on a disc on which recording has been intentionally stopped short of completion to cause recording to fail as mentioned above.

In the example described above, the recording positions of the data on the disc are shifted toward the inner circumference. The inner edge of the lead-in area RIA is located at radial position 22.6 mm. The shift value has to place the inward shift of the data recording positions within this range. It can be seen that the width of the inward shift of the radial recording position must not exceed 1.4 mm. It is also necessary to take into account a margin for normal reproduction of an off-center disc by a DVD player; if this margin is 0.4 mm, the limit of the shift value is 1.0 mm. There is thus a constraint (condition (3a)) that the control information SI must be recorded further outward than the inner limit position of the disc, including the margin consideration; when the shift value is selected, the constraint stated here (condition (3a)) must be included in the selection conditions together with the above conditions (1) and (2a).

The widths of the inward shift of the radial recording position for the exemplary shift values of −1000h and −2000h given above are 0.104 mm and 0.208 mm, respectively, so there is no problem and the selection may be made in an even wider range.

In the example described above, the user information area UIA and the control information area SIA were recorded in this order. The order in which the data are distributed when content is downloaded need not conform to this recording order. Information may be sent in the order of its position on the disc, starting from the inner end. In that case, the received data are temporarily stored on the hard disk 6 of the user terminal device 4 in FIG. 1 and then recorded on the disc by the method shown in this embodiment. If all of the data are stored on the hard disk 6, then even if there is an interruption of communication during the download, the recording onto the disc can be carried out after the complete data have been collected in the user terminal device 4 by retransmission or resumed transmission. An advantage is that because recording failures due to interruption of communication can be prevented, the risk of hacking disguised as unsuccessful recording can be avoided.

As described above, according to the information recording method of the first embodiment, when encrypted content is downloaded and recorded on a recordable optical disc, it is possible to record the complete content correctly just once, and to create an optical disc that can be reproduced by an apparatus for reproducing playback-only optical discs.

It is also possible to avoid the alteration of a disc on which recording failed during the download recording process so as to make the disc reproducible, and avoid having the disc illegally copied.

As a result, an optical disc used as an information recording medium on which recording is carried out by the information recording method according to the first embodiment can completely record the encrypted content while fulfilling the function of avoiding illegal copying partway through the recording, and permits reproduction by existing reproducing apparatus after the recording.

Second Embodiment

The second embodiment shifts the recording positions of the content information and the data in the control information area in a manner similar to the first embodiment, and is generally similar to the first embodiment. It differs, however, in that the data recording position on the disc is shifted outward, and this makes additional processing necessary. The information recording method of the second embodiment is also practiced in, for example, the information recording apparatus shown in FIG. 1.

Figure 8:
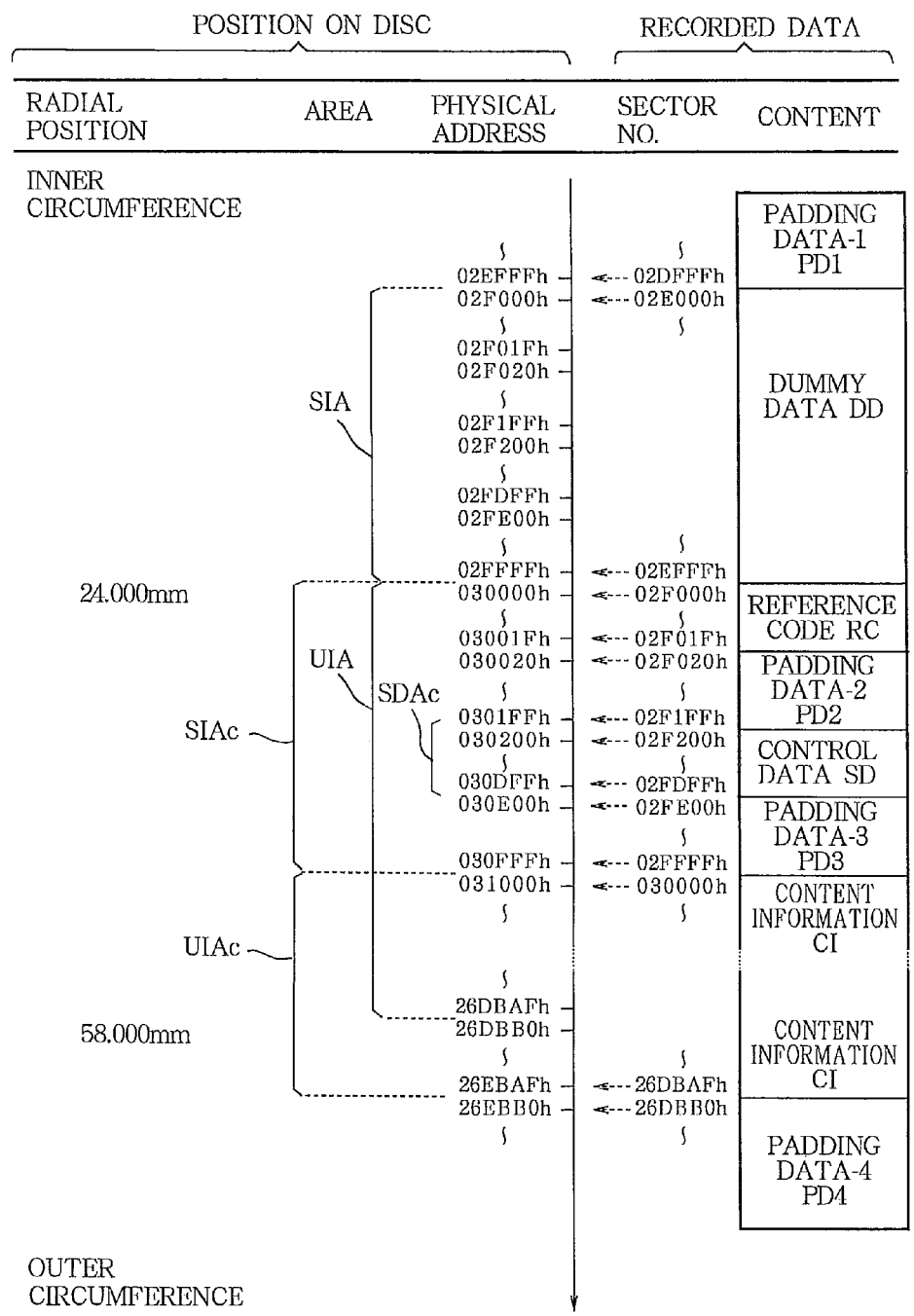
FIG. 8 is a map of areas recorded on an optical disc by the information recording method according to a second embodiment of the invention.

FIG. 8 is a map of areas recorded on an optical disc by the information recording method according to a second embodiment of the invention. As shown by a comparison with FIG. 2, the sectors of content information having sector numbers 030000h to 26 DBAFh, which are data that would normally be recorded in the sectors with physical addresses 030000h to 26 DBAFh (the area UIA in which content information is recorded in a playback-only optical disc) are recorded in the sectors with physical addresses 03100h to 26EBAFh (an area UIAc that is shifted by +1000h with respect to area UIA) in this embodiment, shifting the physical addresses by +1000h. That is, the position on the disc where the content information is recorded on the disc is shifted outward by 1000h sectors (4096 sectors). A positive shift value represents a shift toward the outer circumference.

Similarly, the control data in the second embodiment are recorded in sectors with physical addresses 030200h to 030DFFh (forming an area SDAc, part of the area UIA in which content information is recorded in a playback-only optical disc), the physical addresses being shifted by +1000h. The information SI including control data SD is recorded in an area SIAc (part of the area UIA where content information is recorded in a playback-only optical disc) consisting of sectors with physical addresses 030000h to 030FFFh.

As a result, the sectors with physical addresses 02F000h to 02FFFFh (in the area SIA in which control information is recorded in a playback-only disc), in which data in the control information area would normally be recorded, are left empty, so dummy data DD are recorded as a countermeasure against illegal copying.

FIG. 9 is a map of areas recorded on an optical disc by the information recording method according to the second embodiment of the invention when the shift value is +2000h. In this example, content information CI is recorded in the sectors with physical addresses 032000h to 26FBAFh (area UIAd, shifted by +2000h with respect to the area UIA in which content information is recorded in a playback-only optical disc). Control information area data SI is recorded in the sectors with physical addresses 031000h to 031FFFh (area SIAd, shifted by +2000h with respect to the area SIA in which control information is recorded in a playback-only optical disc, and a part of the area UIA in which content information is recorded in a playback-only optical disc).

As a result, the sectors with physical addresses 02F000h to 02FFFFh (area SIA, on which the control information is recorded in a playback-only optical disc), in which control information area data SI would normally be recorded, are left empty, so dummy data are recorded as a countermeasure against illegal copying. Data having all 00h values, the same as padding data, or data having any value other than 00h, may be recorded as dummy data.

Since the sectors with physical addresses 030000h to 030FFFh (the part of area UIA between area UIAd and area SIAd) are also left empty, padding data-1a (PD1a) are recorded as a continuation of padding data-1 (PDA).

Thus a feature of the second embodiment is that dummy data DD are recorded in the sectors with physical addresses 02F000h to 02FFFFh (area SIA, in which the control information is recorded in a playback-only optical disc), in which control information area data would normally be recorded. The shift value is therefore equal to or greater than +1000h.

The overall procedure of the information recording method of the second embodiment is similar to the procedure shown in FIG. 5. As step STI of FIG. 5, however, the process shown in FIG. 10 is carried out instead of the process shown in FIG. 6. The process shown in FIG. 10 is generally similar to the process described with reference to FIG. 6 in the first embodiment; the differences between them will be explained below.

As in first embodiment, when recording of downloaded content to a recordable optical disc is carried out, after the recording medium 8 is loaded into the recording apparatus 7 (100), the following three major steps (step STI, step STII, step STIII in FIG. 5) are carried out.

The process in step STI (110) starts with the selection (111b) of a position Ra for recording the content information so as to satisfy a condition (3b) and two conditions (1) and (2b) stated below.

Condition (1) is that the selected position Ra (UIAc, UIAd) must be shifted with respect to the physical addresses of the area UIA in which content information CI is recorded in a playback-only optical disc, the same as condition (1) in FIG. 6.

Condition (2b) differs from condition (2a) in FIG. 6; condition (2b) is that the shift value must be a value such that position Rb (CIAc, CIAd) does not include the entire region SIA in which the control information is recorded in a playback-only optical disc. In other words, the control information SI that will be recorded later is not recorded in the area SIA in which the control information is recorded in a playback-only optical disc (the area with physical addresses 02F000h to 02FFFh). This means that control information SI is recorded in the area UIA (030000h and above) in which the content information is recorded in a playback-only optical disc.

Selection of the position Ra entails selection of a shift value. The shift value is selected by, for example, random number generation within a range satisfying the above two conditions (1) and (2b) and the condition (3b) stated below.

Next, the selected shift value is temporarily stored (112) in the user terminal device 4, for example, in the data memory 5c in the communication and control unit 5, after which the content information is recorded at the position Ra determined from the selected shift value (113).

Furthermore, in the second embodiment, as shown in substep ST4, dummy data DD are recorded in the area SIA in which control information is recorded in a playback-only optical disc (114).

Substep ST4 (114) has been described as being carried out after substep ST3 (113), but it can be carried out before substep ST3. The effect is the same at any point in step STI (110).

In step STII (120), as shown in FIG. 7 in the first embodiment, first the position Rb for recording the control information SI is determined by shifting by the same shift value as temporarily stored in step STI with respect to the physical addresses of the area SIA for recording control information SI in a playback-only optical disc (121), and then the control information is recorded at the position Rb (SIAc, SIAd) determined from the temporarily stored shift value (122).

Thus content information CI is recorded first, control information SI is recorded next, and then the recording medium 8 is removed from the recording apparatus 7 in step STIII (130); in this step, first the temporarily stored shift value is deleted (131) and then the disc is ejected (132).

The deletion of the shift value is performed not only when the steps STI (110) and STII (120) shown in FIGS. 5, 10, and 7 are carried out to completion but also when the disc 8 is removed after the shift value is stored in substep (112) of step STI in FIG. 10. This is indicated by dotted lines in FIG. 10.

At the beginning of step STI, dummy data DD are recorded in the sectors with physical addresses 02F000h to 02FFFFh (the area in which control information area data SI would be recorded by the normal recording method (when no shift is performed), in other words, the area SIA in which control information is recorded in a playback-only optical disc).

Consequently, if the disc 8 is removed from the recording apparatus 7 in the interval following the recording of the content information CI and preceding the completion of recording on the disc, it becomes impossible to record control information SI afterward. This is because dummy data DD have been recorded in the sectors with physical addresses 02F000h to 02FFFFh (the area SIA in which control information SI is normally recorded), so it is not clear where the control information area data SI that would normally be recorded in this area SIA should be recorded.

When the disc is used correctly and is not removed partway through the operation, since the shift value is stored in the user terminal device 4, the control information area data SI can be recorded normally by shifting, in the next step STII, the recording position of the control information area data SI by the same amount as the recording position of the content information CI was shifted by, and the positional relationship between the recorded control information area and the content information on the disc can be made the same as the positional relationship in a playback-only optical disc. Whether the disc is a playback-only optical disc or a recorded recordable disc, a reproducing apparatus for reproducing playback-only optical discs, that is, a DVD player, detects only the written sector numbers, so even if the sector numbers do not match the physical addresses, no problem occurs during reproduction.

If the shift value is retained only while the disc 8 is loaded, once the disc is removed from the recording apparatus, the shift value can never be known again. When a normal recording apparatus records in a non-recorded area of a recordable optical disc, it detects position by reading the physical addresses on the disc, recognizes the sector having a physical address that matches the sector number of the data to be recorded as the sector in which the data are to be recorded, and executes the recording process. Accordingly, if the physical addresses and the sector numbers of the sectors to be recorded are shifted, normal recording becomes impossible.

Thus, as in the first embodiment, it is possible to prevent supplementary recording on a disc on which recording has been intentionally stopped short of completion to cause recording to fail as mentioned above.

In the example described above, the recording positions of the data on the disc are shifted toward the outer circumference, so the last part of the content information CI spills over into the lead-out area ROA at the outer circumference. The outer edge of the lead-out area ROA is located at radial position 58.5 mm. The shift value has to place the outward shift of the data recording positions within this range. It can be seen that the width of the outward shift of the radial recording position must not exceed 0.5 mm. It is also necessary to take into account a margin for normal reproduction of an off-center disc by a DVD player; if this margin is 0.1 mm, the limit of the shift value is 0.4 mm. There is thus a constraint (condition (3b)) that the content information CI must be recorded further inward than the outer limit position of the disc, including the margin consideration; when the shift value is selected, the constraint stated here (condition (3b)) must be included in the selection conditions together with the above conditions (1) and (2b).

The widths of the outward shift of the radial recording position for the exemplary shift values of +1000h and +2000h given above are 0.043 mm and 0.086 mm, respectively, so there is no problem and the selection may be made in an even wider range.

In the example described above, the user information area UIA and the control information area SIA were recorded in this order. As pointed out in regard to the first embodiment, the order in which the data are distributed when content is downloaded need not conform to this recording order. Information may be sent in the order of its position on the disc, starting from the inner end. In that case, the received data are temporarily stored on the hard disk 6 of the user terminal device 4 in FIG. 1 and then recorded on the disc by the method shown in this embodiment. If all of the data are stored on the hard disk 6, then even if there is an interruption of communication during the download, the recording onto the disc can be carried out after the complete data have been collected in the user terminal device 4 by retransmission or resumed transmission. An advantage is that because recording failures due to interruption of communication can be prevented, the risk of hacking disguised as unsuccessful recording can be avoided.

As described above, according to the information recording method of the second embodiment, when encrypted content is downloaded and recorded on a recordable optical disc, it is possible to record the complete content correctly just once, and to create an optical disc that can be reproduced by an apparatus for reproducing playback-only optical discs.

It is also possible to avoid the alteration of a disc on which recording failed during the download recording process so as to make the disc reproducible, and avoid having the disc illegally copied.

As a result, an optical disc used as an information recording medium on which recording is carried out by the information recording method according to the second embodiment can completely record the encrypted content while fulfilling the function of avoiding illegal copying partway through the recording, and permits reproduction by existing reproducing apparatus after the recording.

Third Embodiment

The information recording method of the third embodiment is also practiced in, for example, the information recording apparatus shown in FIG. 1. The overall procedure of the information recording method of the third embodiment is similar to the procedure shown in FIG. 5. As step STI of FIG. 5, however, the process shown in FIG. 11 is carried out instead of the process shown in FIG. 6. The process shown in FIG. 11 is generally similar to the process described with reference to FIG. 6 in the first embodiment and the process described with reference to FIG. 10 in the second embodiment, but both positive values and negative values are selectable as the shift value, in which sense it could be described as a combination of the method of FIG. 6 and the method of FIG. 10. The differences from the methods illustrated in FIGS. 6 and 10 will be described below.

Reference characters in FIG. 11 that are the same as in FIG. 6 or 10 indicate similar procedures.

Substep ST1 (111c) of step STI is similar to substep 111a in FIG. 6 and substep 111b in FIG. 10, but the conditions used for selection of the position Ra for recording the content information are neither the conditions (1), (2a), (3a) of substep 111a in FIG. 6 nor the conditions (1), (2b), (3b) of substep 111b in FIG. 10; conditions (1), (2c), (3a), and (3b) are used.

Condition (1) is as described with reference to FIGS. 6 and 10; the selected position Ra must be shifted with respect to the physical address of the area in which the content information is recorded in a playback-only optical disc.

Condition (2c) is that the magnitude (absolute value) of the shift value is larger than the size of the area SIA in which control information is recorded.

Condition (3a) is as described with reference to FIG. 6; after shifting, the control information SI must be recorded further outward than the inner limit position of the disc, including the margin consideration.

Condition (3b) is as described with reference to FIG. 10; after shifting, the content information CI must be recorded further inward than the outer limit position of the disc, including the margin consideration.

Following substep ST3 (113), an additional decision substep ST5 (115) is performed in which it is decided whether or not the position Ra based on the temporarily stored shift value includes the area SIA in which the control information is recorded in a playback-only optical disc. This decision may be made, for example, as follows: if the shift value is negative, it is determined that Ra includes SIA; if the shift value is positive, it is determined that Ra does not include SIA.

When the temporarily stored shift value is a value such that position Ra does not include the region SIA in which the control information is recorded in a playback-only optical disc, dummy data DD are recorded in the area SIA in which the control information is recorded in a playback-only optical disc, as shown in substep ST4 (114).

When the temporarily stored shift value is a value such that position Ra includes the region SIA in which the control information is recorded in a playback-only optical disc, the process proceeds to step STII.

The decision substep ST5 (115) and substep ST4 (114) have been described as being carried out after substep ST3 (113), but recording may proceed in the reverse order. That is, decision substep ST5 (115) may be carried out first; if the decision in substep ST5 (115) is that Ra includes SIA, the process proceeds to substep 113; if the decision in substep ST5 (115) is that Ra does not include SIA, the process proceeds from substep ST5 (115) to substep ST4 (114) and then to substep ST3 (113). The effect is the same at any point in step STI (110).

The processing in steps STII and STIII is carried out as in FIGS. 6 and 10. In particular, the deletion (131) of the temporarily stored shift value when the recording medium 8 is removed from the recording apparatus 7 is carried out in step STIII (130) as explained with reference to FIG. 6 or FIG. 10.

Also, as in the first and second embodiments, the deletion of the shift value is carried out not only when steps STI (110) and STII (120) in the procedure shown in FIGS. 5, 11, and 7 are carried out to completion but also when the disc 8 is removed after the shift value is stored in substep (112) of step STI in FIG. 11. This is indicated by dotted lines in FIG. 11.

Except for the points described above, the third embodiment is similar to first and second embodiments, and provides the same effects as the first and second embodiments.

The advantage of the third embodiment is that the range over which shift values can be selected is doubled. The purpose of this invention is to avoid illegal copying or alteration of content by supplemental recording on a partly recorded disc, by hiding the shift value from the user. Thus, the wider the range of the shift values is, the greater the effect is.

In the embodiments above, the magnitude (absolute value) of the shift value of the recording position is larger than the size of the area SIA in which the control information is recorded, but this is not a limiting condition on the invention. The shift value of the recording position may have a magnitude (absolute value) less than the size of area SIA in which the control information is recorded. In other words, it need not satisfy condition (2a) in first embodiment, condition (2b) in the second embodiment, or condition (2c) in the third embodiment. Even if the magnitude is less than the size of the area SIA in which the control information is recorded, a shift in recording position causes at least part of the control information to be recorded in an area outside the area in which the control information is recorded in a playback-only optical disc. If the shift value is unknown, at least a part of the control information will not be reproduced correctly, so the content information cannot be reproduced.

A DVD-R in which physical addresses are represented by embossed pits has been described above. In a DVD+R, physical addresses are represented by modulating the phase and period of the wobble of the groove. The invention is also applicable to this case.

In the above description, recording is performed at a user's terminal, but the invention is not limited to terminals (user terminals in the narrow sense) used by general users (users who record for their own private purposes); the invention is applicable to recording performed on other information terminals, and to the manufacture of information recording media by such recording.

What is claimed is:

1. An information recording method for recording downloaded data, downloaded from a server and received by an information terminal device, on a recordable optical disc by means of a recording apparatus with which the information terminal device is equipped, and thereby providing an information recording medium reproducible by a reproducing apparatus for a prescribed playback-only optical disc, the downloaded data comprising control information including a content encryption key and content information including data encrypted using the encryption key, the information recording method comprising:
    a first step of recording the content information in a first prescribed position on the recordable optical disc;
    a second step of recording the control information in a second prescribed position on the recordable optical disc, after the first step;
    the first step having
    a substep of selecting a shift value for shifting the first prescribed position within a prescribed range with respect to physical addresses of an area in which the content information is recorded in the playback-only optical disc,
    a substep of temporarily storing the selected shift value in the information terminal device, and
    a substep of recording the content information in the first prescribed position determined by the selected shift value;
    the second step determining the second prescribed position as a position shifted by an amount identical to the temporarily stored shift value with respect to physical addresses of an area in which the control information is recorded in the playback-only optical disc, and recording the control information in the second prescribed position; and
    a step of deleting the temporarily stored shift value after the optical disc is removed from the recording apparatus once the first step of recording has started.

2. The information recording method of claim 1, wherein in the substep of selecting the shift value in the first step, the shift value is selected so that the area in which the control information is recorded in the playback-only optical disc is included in the first prescribed position.

3. The information recording method of claim 1, wherein:
    in the substep of selecting the shift value in the first step, the shift value is selected so that the area in which the control information is recorded in the playback-only optical disc is not included in the second prescribed position; and
    the first step further includes a substep of recording dummy data in the area in which the control information is recorded in the playback-only optical disc.

4. The information recording method of claim 1, wherein the first step further includes:
- a substep of deciding whether the first prescribed position determined by the selected shift value includes the area in which the control information is recorded in the playback-only optical disc; and
- a substep of recording dummy data in the area in which the control information is recorded in the playback-only optical disc if it is decided, in the substep of deciding, that the first prescribed position determined by the selected shift value does not include the area in which the control information is recorded in the playback-only optical disc.

5. An information recording apparatus for recording downloaded data downloaded from a server on a recordable optical disc and thereby providing an information recording medium reproducible by a reproducing apparatus for a prescribed playback-only optical disc, the downloaded data comprising control information including a content encryption key and content information including data encrypted using the encryption key, the information recording apparatus comprising:
- a recording apparatus for recording the downloaded data downloaded from the server on the recordable optical disc; and
- a communication and control apparatus for making the recording apparatus record the content information in a first prescribed position on the recordable optical disc and record the control information in a second prescribed position on the recordable optical disc after the content information has been recorded; wherein
- the communication and control apparatus
- selects a shift value for shifting the first prescribed position within a prescribed range with respect to physical addresses of an area in which the content information is recorded in the playback-only optical disc, temporarily stores the selected shift value in a memory in the information recording apparatus, and causes the content information to be recorded in the first prescribed position determined by the selected shift value,
- determines the second prescribed position as a position shifted by an amount identical to the temporarily stored shift value with respect to physical addresses of an area in which the control information is recorded in the playback-only optical disc, and causes the control information to be recorded in the second prescribed position, and
- deletes the temporarily stored shift value from the memory after the optical disc is removed from the recording apparatus once the recording of the content information has started.

6. The information recording apparatus of claim 5, wherein the communication and control apparatus selects the shift value so that the area in which the control information is recorded in the playback-only optical disc is included in the first prescribed position.

7. The information recording apparatus of claim 5, wherein the communication and control apparatus:
- selects the shift value so that the area in which the control information is recorded in the playback-only optical disc is not included in the second prescribed position; and
- records dummy data in the area in which the control information is recorded in the playback-only optical disc.

8. The information recording apparatus of claim 5, wherein the communication and control apparatus:
- decides whether the first prescribed position determined by the selected shift value includes the area in which the control information is recorded in the playback-only optical disc; and
- causes the recording apparatus to record dummy data in the area in which the control information is recorded in the playback-only optical disc if it is decided that the first prescribed position determined by the selected shift value does not include the area in which the control information is recorded in the playback-only optical disc.

9. An information recording medium in which content information and control information have been written by the information recording method of claim 1.

10. An information recording medium in which content information and control information have been written by the information recording apparatus of claim 5.

11. An information recording medium manufacturing method for manufacturing an information recording medium in which content information and control information have been written by the information recording method of claim 1.

12. An information recording medium manufacturing apparatus including the information recording apparatus of claim 5, for manufacturing an information recording medium in which content information and control information have been written.

13. An information recording method for recording data, transferred for recording by an information terminal device, on a recordable optical disc by means of a recording apparatus with which the information terminal device is equipped, and thereby providing an information recording medium reproducible by a reproducing apparatus for a prescribed playback-only optical disc, the data comprising control information including a content encryption key and content information including data encrypted using the encryption key, the information recording method comprising:
- a first step of recording the content information in a first prescribed position on the recordable optical disc;
- a second step of recording the control information in a second prescribed position on the recordable optical disc, after the first step;
- the first step having
- a substep of selecting a shift value for shifting the first prescribed position within a prescribed range with respect to physical addresses of an area in which the content information is recorded in the playback-only optical disc,
- a substep of temporarily storing the selected shift value in the information terminal device, and
- a substep of recording the content information in the first prescribed position determined by the selected shift value;
- the second step determining the second prescribed position as a position shifted by an amount identical to the temporarily stored shift value with respect to physical addresses of an area in which the control information is recorded in the playback-only optical disc, and recording the control information in the second prescribed position; and
- a step of deleting the temporarily stored shift value after the optical disc is removed from the recording apparatus once the first step of recording has started.

14. An information recording apparatus for recording data transferred for recording on a recordable optical disc and thereby providing an information recording medium reproducible by a reproducing apparatus for a prescribed playback-only optical disc, the data comprising control information including a content encryption key and content information including data encrypted using the encryption key, the information recording apparatus comprising:

a recording apparatus for recording the data transferred for recording on the recordable optical disc; and a communication and control apparatus for making the recording apparatus record the content information in a first prescribed position on the recordable optical disc and record the control information in a second prescribed position on the recordable optical disc after the content information has been recorded; wherein the communication and control apparatus selects a shift value for shifting the first prescribed position within a prescribed range with respect to physical addresses of an area in which the content information is recorded in the playback-only optical disc, temporarily stores the selected shift value in a memory in the information recording apparatus, and causes the content information to be recorded in the first prescribed position determined by the selected shift value, determines the second prescribed position as a position shifted by an amount identical to the temporarily stored shift value with respect to physical addresses of an area in which the control information is recorded in the playback-only optical disc, and causes the control information to be recorded in the second prescribed position, and deletes the temporarily stored shift value from the memory after the optical disc is removed from the recording apparatus once the recording of the content information has started.

15. The information recording method of claim 13, wherein in the substep of selecting the shift value in the first step, the shift value is selected so that the area in which the control information is recorded in the playback-only optical disc is included in the first prescribed position.

16. The information recording method of claim 13, wherein:

in the substep of selecting the shift value in the first step, the shift value is selected so that the area in which the control information is recorded in the playback-only optical disc is not included in the second prescribed position; and the first step further includes a substep of recording dummy data in the area in which the control information is recorded in the playback-only optical disc.

17. The information recording method of claim 13, wherein the first step further includes:

a substep of deciding whether the first prescribed position determined by the selected shift value includes the area in which the control information is recorded in the playback-only optical disc; and a substep of recording dummy data in the area in which the control information is recorded in the playback-only optical disc if it is decided, in the substep of deciding, that the first prescribed position determined by the selected shift value does not include the area in which the control information is recorded in the playback-only optical disc.

18. The information recording apparatus of claim 14, wherein the communication and control apparatus selects the shift value so that the area in which the control information is recorded in the playback-only optical disc is included in the first prescribed position.

19. The information recording apparatus of claim 14, wherein the communication and control apparatus:

selects the shift value so that the area in which the control information is recorded in the playback-only optical disc is not included in the second prescribed position; and records dummy data in the area in which the control information is recorded in the playback-only optical disc.

20. The information recording apparatus of claim 14, wherein the communication and control apparatus:

decides whether the first prescribed position determined by the selected shift value includes the area in which the control information is recorded in the playback-only optical disc; and causes the recording apparatus to record dummy data in the area in which the control information is recorded in the playback-only optical disc if it is decided that the first prescribed position determined by the selected shift value does not include the area in which the control information is recorded in the playback-only optical disc.

21. An information recording medium in which content information and control information have been written by the information recording method of claim 13.

22. An information recording medium in which content information and control information have been written by the information recording apparatus of claim 14.

23. An information recording medium manufacturing method for manufacturing an information recording medium in which content information and control information have been written by the information recording method of claim 13.

24. An information recording medium manufacturing apparatus including the information recording apparatus of claim 14, for manufacturing an information recording medium in which content information and control information have been written.

* * * * *